B. M. WATTS.
Portable Baling-Press.

No. 225,773. Patented Mar. 23, 1880.

Witnesses
Frank A. Brooks
J. H. Srouse

Inventor
Benjamin M. Watts
By Dewey & Co.
Atty

UNITED STATES PATENT OFFICE.

BENJAMIN M. WATTS, OF PHŒNIX, ARIZONA TERRITORY.

PORTABLE BALING-PRESS.

SPECIFICATION forming part of Letters Patent No. 225,773, dated March 23, 1880.

Application filed December 27, 1879.

*To all whom it may concern:*

Be it known that I, BENJAMIN M. WATTS, of Phœnix, county of Maricopa, Territory of Arizona, have invented a Portable Baling-Press; and I hereby declare the following to be a full, clear, and exact description thereof.

The object of my invention is to provide a portable baling-press which is so constructed as to be moved from place to place about a field in which hay has been cut, and bale the hay as it lies in the windrows, where it has been left by the rakes.

It is not intended to form a portable baling-press in the sense in which this phrase is usually applied, since it is given to presses which are so arranged that they may be lifted on trucks or wheels and carried from stack to stack, being fixed for days at a time in one position while at work.

The portable baling-press which I have designed is intended to be moved about the field from place to place where the hay lies as it has been cut and raked, and there is no necessity of bringing the hay to the press or transporting and stacking a quantity in one place, so as to save moving the press. This is the prime or paramount object of the invention, the peculiar combination and construction being such that these results are obtained by the minimum of expenditure of time, labor, and money.

My invention provides a horizontal press mounted on a wagon, to which the horses are always hitched while it is worked, and the hay in the field is baled and left in bales. These bales may then be hauled to the barn or elsewhere and stored, the product having, therefore, to be moved only once instead of twice, as when the hay is first stacked in the field, then baled, and then moved in bales.

Figure 1:
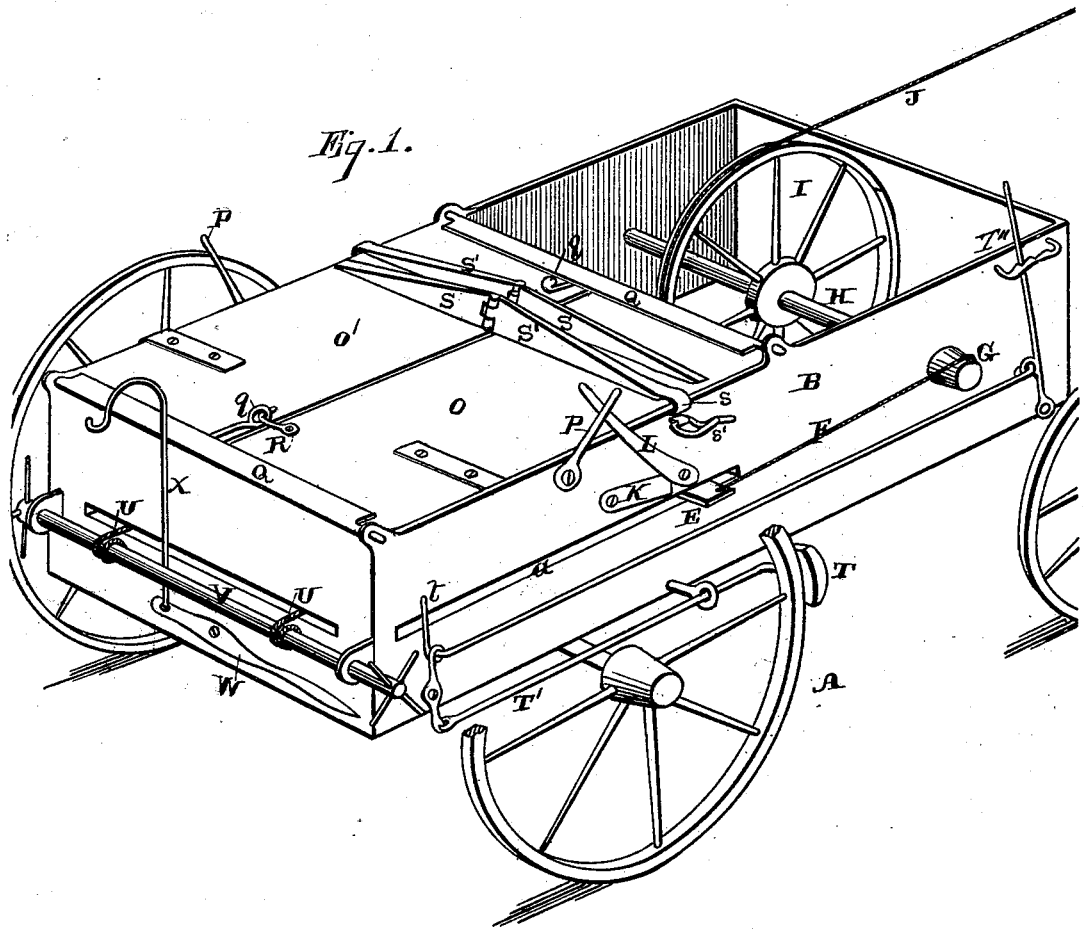
Figure 2:
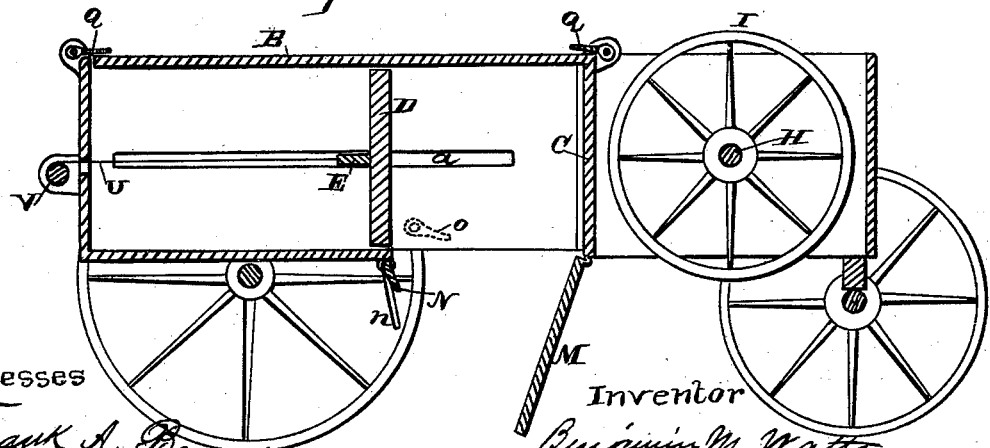

Figure 1 is a perspective view of my portable hay-press. Fig. 2 is a longitudinal section of the same.

In order to carry out my invention I take the common running-gear of an ordinary light farm-wagon, (represented by A,) and upon this mount the box or bed B, which forms a permanent fixture on the wagon, if desired, or may be so arranged as to be removable. A head-block or partition, C, is framed into the box or bed, firmly secured to the sides, and the inner surface of this head-block is grooved to receive the bale-bands, as hereinafter described.

Fitted to the inside of the box or press B is the follower D, arranged to slide forward and back in said press, this follower being provided with a bar, E, which projects through slots $a$ in the sides of the box, as shown. To the projecting ends of this bar are attached the cords or chains F, which pass forward along the sides of the press and wind on the spirally-grooved cone-pulleys G, rigidly attached to the projecting ends of the shaft H, carrying the bull-wheel or pulley I.

The shaft H is journaled on the sides of the box or body, the wheel I revolving inside of the front axle and between it and the head-block or partition C.

A rope, J, encircles the wheel or pulley I, and leads in line with the pole of the wagon. As this rope is unwound from the wheel I the shaft H is turned, winding up the chains F and drawing the follower D E forward, compressing the hay between said follower and the head-block. The action of the ropes attached to the bar of the follower in winding on the conical grooved pulleys is such as to furnish greater power but less speed as the follower nears the head-block. Thus there is greater speed when starting, when little power is required, and as the resistance becomes greater more power and less speed is given.

On the sides of the box or body are hinged bars K, on the ends of which are swiveled cam-ended levers L. As the follower is drawn forward these hinged bars K drop down behind the ends of the follower-bar and hold the bale while being tied, the follower being thus prevented from being pushed back by the pressure of the bale.

When it is desired to release the follower the outer ends of the levers L are lifted and their rounded or cam-shaped ends, resting on the ends of the follower-bar, lift the hinged bars K free, and the follower may slide back and the bale be released.

The front part of the bottom of the hay-press has a downwardly-opening door, M, hinged on one side, and having its other end held by the pivoted catch N, having an arm or lever, $n$, engaging with a hook, $o$, on the side of the box or press. By releasing the hook o from the arm of the catch or flanged rod N the door will drop downward and the bale be released. When the catch N is raised up its edge underlaps the door and holds it in place.

Two upwardly and outwardly swinging hinged doors, O O', cover that portion of the box in which the follower travels and the hay is pressed. These doors, when open, rest on inclined rods or supports P, and thus flare away from the box and press in a manner so that any hay thrown upon them will be directed into the press. As soon as the box is filled with hay or other material these doors are closed down. Hinged or pivoted clamps Q, extending across the top of the press, swing down over the ends of the doors, and these clamps, being provided with hooks q, are held in place by the latches R engaging with said hooks.

On top of each door is a laterally-extending brace, S, having a hinged laterally-swinging extension, S'. When the doors are open these extensions are swung back, each longitudinally with its own door. When the doors are shut these extensions are swung transversely, each extension covering or overlapping the door opposite to that upon which it is hinged. The hooks s, on the ends of these extensions, then clasp the sides of the box or case, which prevents any lateral internal pressure from spreading the sides; and loops or catches s', on the sides of the box, prevent upward pressure from lifting the hooked extensions from their places, and aid the clamps Q in holding the doors closed. These bars, with their extensions, hooks, and loops, serve as central braces for the doors, as well as prevent lateral expansion of the box or press.

An ordinary hand-brake, T, with its brake-bar T', may be used on this movable press; but I add an extension, t, to the lever, which shall come in contact with the follower-bar E, so that as soon as the follower is drawn forward the brake will be thrown on automatically and the wheels be locked. As soon, therefore, as the horses, when unhitched from the running-gear, begin to draw on the bull-wheel rope and draw the follower forward, the follower-bar E comes in contact with the extension t of the brake-lever, moving the brake-bar T' back, so as to bring the brake in contact with the wheels, and moving the hand-lever T'' forward so it catches on the ratchet or teeth and holds the brake on.

The follower is drawn back by means of the windlass V, with its cords v, at the rear of the press. As the follower is thus drawn back the hauling-rope is rewound on the bull-wheel or large pulley ready for the next pull forward.

On the rear end of the press is a lever, W, carrying a vertically-sliding curved beam or hook, X, upon which a pair of scales may be fastened. The office of this hook and lever is to lift the bale when the scales are hooked on, that the weight of said bale may be ascertained as soon as it is formed and dropped from the press. It is not then necessary to lift the bale onto a pair of platform-scales for weighing.

After the hay has been cut by the mower it is ordinarily raked into windrows, either by hand or horse rakes. It is then forked into wagons, which carry it to the stacks, of which several may be formed in a large field. At these stacks the hay is made into bales by the presses, and then carried to the barn. The object of forming these stacks is to obviate the necessity of moving the hay-press too frequently. Frequent moving and setting would consume so much time and labor that it would render the baling operation unprofitable. This setting up is a very tedious and laborious process, consuming usually about half a day, and often a whole day, for a single moving and setting.

The common press is moved from a wagon and set up beside the stack until all the hay in that stack is baled, and it is then put on wheels again and moved to the next stack, the operation there being repeated. A few are operated on low iron trucks, to which they are fixed for convenience of moving from stack to stack; but they are not of the best, and do not form a portable press in the sense in which my invention stands. With mine I can trot into a field of hay, throw open the doors, and am ready for work instantly.

With my movable horizontal press, however, no stacks at all are formed. The press is moved along near the windrow by the team, stopping at suitable intervals to form a bale. The upper doors are swung open and the box or case filled with hay. The doors are then closed and fastened by the clamps and extensions, as described, and the double-tree pin withdrawn, the bull-wheel rope then being fastened to them by means of the staple in the double-trees and hook on the end of the rope being attached. As the horses start ahead they unwind the rope from the pulley or bull-wheel, the shaft of said wheel then winding up on its cone-pulleys the rope or chains attached to the follower-bar, thus drawing the follower forward and pressing the hay. As the follower-bar starts forward it comes in contact with the extension of the brake-rod lever and throws on the brake, as described. When the follower comes as far forward as necessary the hinged catches on the sides drop behind the bar E and hold the follower in place while the bale is being tied by the ropes. As soon as the bale is tied the hand-levers are operated to lift the hinged catches and free the follower, which may be drawn back by the windlass. The bottom is then released and the bale drops out under the press. It is moved to the rear, the scales hooked on, and the lever lifts the bale up, hanging on the scales to ascertain the weight. The bull-rope is unhooked from the double-trees, they are secured to the pole, and the horses move the press ahead a little, when the operation is repeated, the press being moved generally once each time a bale is made. In this way one press goes all over the field and leaves the hay baled ready to be put in the barn or taken to market.

Loading and stacking loose hay is dispensed with entirely, the press being brought to the hay instead of the hay to the press. The baled hay may be put under shelter immediately, and not be left in stacks in the field for a length of time awaiting the press. In hilly and mountainous sections particularly, this press will be found very useful and convenient, although, of course, it may be used on any kind of ground.

Having thus described my invention, what I claim as new, and desire to secure by Letters Patent, is—

1. The box or press B, permanently fitted on the wheels A, with its head-block C, follower D, having the bar E projecting through the side slots, $a$, with chains F, leading to the pulleys G on the shaft H, carrying the bull-wheel I and rope J, said box or press being provided with the downwardly-opening door M, with its catch N, arm $n$, and hook $o$, and the upwardly-swinging doors O O', with their supports P, clamps Q, hooks $q$, and latch R, and the laterally-extending swinging braces S S', provided with hooks $s$ and clamps Q, the whole forming a movable baling-press for work in a field of loose hay, substantially as and for the purpose herein described.

2. In combination with the upwardly and outwardly swinging doors O O' of the press or box B, mounted permanently on the wheels A, and carrying a follower, D, for pressing hay, the pivoted or hinged clamps Q, provided with hooks $q$ and latches R, and the laterally-extending braces S, with their extensions S', provided with hooks $s$ and loops $s'$, whereby said doors are held closed and lateral swelling of the box or press prevented, substantially as herein described.

3. In combination with the follower D and bar E, adapted to be drawn forward by the ropes or chains F, in a press or box, B, mounted on wheels A, the hinged bars or dogs K, carrying the hinged cam-ended levers L, whereby the follower is made to hold the bale, while being tied, by the said bars K automatically engaging with it, while it may be readily relieved by means of the lever, L, substantially as herein described.

4. In a horizontal portable baling-press, B, having a follower, D E, and mounted permanently on the running-gear A, the extension $t$ of the brake-lever, in combination with the brake-bar T', connected with the hand-brake T by said lever, said follower being adapted to engage with said extension, whereby the forward movement of the follower throws on the brakes and locks the wheels, substantially as and for the purpose herein described.

In witness whereof I have hereunto set my hand.

BENJAMIN MARION WATTS.

Witnesses:
VINTON L. MITCHELL,
C. H. CONDER.